UNITED STATES PATENT OFFICE.

DAVID AVERY, OF MELBOURNE, VICTORIA, AUSTRALIA, ASSIGNOR TO AMALGAMATED ZINC (DE BAVAY'S,) LIMITED, OF MELBOURNE, VICTORIA, AUSTRALIA.

RECOVERY OF LEAD AND SILVER FROM SULPHIDE ORES AND METALLURGICAL PRODUCTS.

1,402,732.　　　　Specification of Letters Patent.　　Patented Jan. 10, 1922.

No Drawing.　　Application filed April 15, 1920. Serial No. 374,108.

*To all whom it may concern:*

Be it known that I, DAVID AVERY, a subject of the King of Great Britain, residing at Collins House, 360-366 Collins Street, Melbourne, in the State of Victoria, Commonwealth of Australia, have invented certain new and useful Improvements in the Recovery of Lead and Silver from Sulphide Ores and Metallurgical Products, of which the following is a specification.

This invention relates to the extraction of lead and silver from sulphide ores and metallurgical products and refers more particularly to the sulphide ores containing lead and silver and zinc such as those of Broken Hill.

This invention is applicable to concentrates, slimes, tailings and the like and the term "ores" when used in this specification is to be held to include such products.

One of the methods of treating sulphide ores is to effect a preferential chloridizing of the lead and silver present leaving the zinc sulphide substantially unaffected and subsequently leaching out the said lead and silver chlorides leaving the zinc in the residues.

One of the methods for effecting this purpose is to mix the said ores with rather more than the quantity of zinc chloride requisite to preferentially chloridize the lead and silver present and to heat the said mixture without access of air in a closed vessel. The extraction of the lead and silver simultaneously from the chloridized product has then been effected by leaching with a cold solution (such as brine or sodium thiosulphite) taking precautions to prevent the reversion of the chlorides to sulphides as by working under such conditions that the contact between the ore and the solution was reduced to a minimum or alternatively using a brine solution containing a substance which has a chlorodizing effect (such as ferric chloride). When it was desired to extract the lead and silver separately, the chloridized product was first leached with a solution (such as hot concentrated brine) containing a small proportion of zinc chloride and then subsequently extracting the silver by leaching with a brine solution containing a small percentage of ferric chloride.

Now the object of the present invention is to so conduct the leaching operations on an ore in which the lead and silver have been preferentially chloridized that a more satisfactory recovery of both the silver and the lead is effected leaving a zincy residue practically free from silver and lead.

In carrying out the process according to this invention the ore is first chloridized in the usual manner such as by furnacing with zinc chloride and the excess of zinc chloride is then leached out with cold water preferably acidulated with hydrochloric acid. The product so obtained is then leached with a cold brine solution containing also a little ferric chloride sufficient to leave a slight excess in solution after leaching thus dissolving out practically the whole of the silver chloride and leaving a residue from which the lead is then dissolved by a hot brine solution.

The cold brine containing ferric chloride used for extracting the silver is usually saturated with lead chloride so that no lead is extracted from the product under treatment while the silver is being extracted.

In some cases however it may be convenient to leach with brine containing a ferric chloride but not saturated with lead chloride, for example, in starting the process the leaching solution could be allowed to dissolve lead chloride to saturation at the expense of the lead contained in the first quota of chloridized product.

It is also conceivable that there may be circumstances when it would be of advantage to remove a portion of the lead contents of the ore with the silver in the cold brine.

In an actual example a zinc concentrate containing eight ounces of silver per ton and six per cent of lead was mixed with a 33% excess of zinc chloride over that required to chloridize such metals and the mixture was furnaced in a continuously operating air sealed furnace. The product was washed with cold water acidulated with hydrochloric acid to dissolve out the excess zinc chloride and then agitated for three hours with a cold brine solution containing 24% of sodium chloride, and ferric chloride equivalent to 3 grams of metallic iron per litre. The material was allowed to settle quickly, the clear solution decanted and the residue washed with cold brine solution thus removing the silver. The silver free residue was then rapidly agitated with a hot brine solution, and the material allowed to settle quickly and the clear solution decanted and finally washed with hot brine and filtered to remove the lead. Although the whole of such leaching and decanting operations took more than three hours the residues contained only .27% of lead and 1.2 ozs. of silver per ton whereas under ordinary leaching conditions the major portion of the silver and a large proportion of the lead would have reverted and become insoluble in such period.

In another example, an ore containing 7.4% of lead and 8 ozs. of silver per ton was mixed with zinc chloride 30% in excess of the amount necessary to chloridize all the lead and silver present and the mixture heated in a closed furnace to a temperature sufficiently high to effect chloridization. The furnaced product was then charged into a vessel to form a bed 3 feet deep and a preliminary wash of 3.3 gals. of cold acidified water per 100 lbs. of ore run through. Through the washed product was then percolated for every 100 lbs. of ore present 13.3 gals. of a solution containing 24% of sodium chloride, ferric chloride equivalent to 3 grams of iron per litre and saturated with lead chloride at the temperature of leaching (i. e. 20° C.) thereby removing the silver. The substantially silver free product then had 23.3 gals. of neutral brine at a temperature of 95° C. percolated through for every 100 lbs. of ore present thereby dissolving the lead chloride. The residues contained .57% of lead and 1.4 ozs. of silver per ton.

Though the examples of this invention have been described as applied to chloridized products obtained by the method of operation indicated, viz., by furnacing with zinc chloride, it will be understood that the invention is also applicable to products in which similar preferential chloridizing of the lead and silver has been obtained in other ways.

I claim—

1. In the recovery of silver from sulphide ores which have been subjected to chloridizing treatment leaching the chloridized material containing lead and silver with a cold brine solution saturated with lead chloride and containing ferric chloride.

2. In the recovery of lead and silver from sulphide ores which have been subjected to a chloridizing treatment first leaching the chloridized material with a cold brine solution containing ferric chloride and lead chloride thereby extracting substantially the whole of the silver and a proportion of the lead and then leaching with a solution that will extract substantially the whole of the remaining lead from the silver free residue.

3. In the recovery of lead and silver from sulphide ores which have been subjected to a chloridizing treatment first leaching the chloridized material with a cold brine solution containing ferric chloride and saturated with lead chloride thereby extracting the silver and then leaching with a hot brine solution and thereby extracting the lead from the silver free residues.

4. In the recovery of lead and silver from sulphide ores, a process comprising mixing the ore with sufficient zinc chloride to chloridize the lead and silver present, heating the mixture without access of air at a temperature sufficiently high to chloridize these metals, then leaching the chloridized products with a cold brine solution saturated with lead chloride and also containing ferric chloride thereby extracting the silver, and finally leaching with a hot brine solution to extract the lead.

5. In the recovery of lead and silver from sulphide ores, a process comprising mixing the ore with sufficient zinc chloride to chloridize the lead and silver present, heating this mixture without access of air at a temperature sufficiently high to chloridize these metals, washing the chloridized product with water acidified by hydrochloric acid, then leaching with a cold brine solution saturated with lead chloride and also containing ferric chloride thereby extracting the silver contents, and finally leaching with a hot brine solution to extract the lead.

6. In the recovery of lead and silver from sulphide ores, a process comprising mixing the ore with sufficient zinc chloride to chloridize the lead and silver present, heating this mixture without access of air at a temperature sufficiently high to chloridize these metals, washing the chloridized product with water acidified by hydrochloric acid, then agitating with a cold brine solution saturated with lead chloride and also containing ferric chloride, filtering off the silver bearing solution, agitating the silver free residues with a hot brine solution, and finally filtering off the lead bearing solution.

7. In the recovery of lead and silver from sulphide ores, a process comprising mixing the ore with sufficient zinc chloride to chloridize the lead and silver present, heating this mixture without access of air at a temperature sufficiently high to chloridize these metals, then washing with water acidified by hydrochloric acid, percolating through the ore a cold brine solution saturated with lead chloride and also containing ferric chloride thereby extracting the silver contents, and finally percolating a hot brine solution through the silver free residues thereby extracting the lead.

In testimony whereof I have signed my name to this specification in the presence of two subscribing witnesses.

DAVID AVERY.

Witnesses:
J. L. CULLEN,
V. G. ANDERSON.